US006189058B1

United States Patent
Jones, III et al.

(10) Patent No.: US 6,189,058 B1
(45) Date of Patent: Feb. 13, 2001

(54) CROSSBAR CONNECT SWITCH MECHANISM FOR HOT PLUGABILITY

(75) Inventors: Morrel O. Jones, III; Usha Rajagopalan, both of Houston, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/249,032

(22) Filed: Feb. 12, 1999

(51) Int. Cl.$^7$ ................................................ G06F 13/00
(52) U.S. Cl. .................................................... 710/103
(58) Field of Search ................................. 710/101, 102, 710/103

(56) References Cited

U.S. PATENT DOCUMENTS

| | | | |
|---|---|---|---|
| 5,555,510 | * | 9/1996 | Verseput et al. .............. 710/102 |
| 5,784,576 | * | 7/1998 | Guthrie et al. ................ 710/103 |
| 5,948,090 | * | 9/1999 | Heinrich et al. ............... 710/128 |

OTHER PUBLICATIONS

PCI Bus Hot Plug Spec, Revision 1.0, Jun. 15, 1997.*
PCI Local Bus Spec, Revision 2.1, Jun. 1, 1995.*

* cited by examiner

Primary Examiner—David A Wiley

(57) ABSTRACT

The present invention makes it possible to safely hot plug a PCI expansion slot connected to a 64 bit, 66 Megahertz PCI bus. The PCI bus comprises a plurality of signal lines connecting a PCI Controller to the expansion slot. On each signal line there is a quick switch disposed thereon to detach the signal line from the expansion slot. A bus_enable signal activates the quick switches and a Req_64 mode line to detach or attach the PCI bus from the expansion slot. The Req_64 mode line bypasses the quick switches and goes through a crossbar switch. The crossbar switch has its open state set to an active low wherein the 64 bus mode is thereby communicated to the card as an active low even when the other signal lines of the bus are in a high disconnected state.

18 Claims, 5 Drawing Sheets

CROSSBAR CONNECT SWITCH MECHANISM FOR HOT PLUGABILITY

BACKGROUND OF THE INVENTION

1. Technical Field of the Invention

This invention relates generally to PCI hot plug technology.

2. Description of Related Art

PCI Hot Plug technology allows a server to be upgraded and serviced without powering down the entire system. A hot-pluggable PCI (peripheral component interconnect) interface card, which can be removed and inserted without turning off the server, is valuable because it can increase the availability of the server. This is becoming a very important attribute of PC servers since the higher reliability factor the searchers, the less potential a server has of being shut down and going off line. As can be appreciated servers that go off line can have an extremely adverse impact on a company-wide network.

Previous practice was to maintain the modular components or printed circuit boards of a server by turning the power to the server off before any modular components or printed circuit boards were removed from or added to the chassis or support frame of the server. Recent innovations have centered around a highly desirable design goal of "hot-plugability" which addresses the benefits derived from being able to insert and remove modular components and printed cards from a server when the server is electrically connected and operational. It can be readily appreciated that modularization and hot-plugability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician. In particular, when Hot-Plug PCI cards are commercialized, interface cards and storage devices, two of the most critical plug-in devices in a PC server will be capable of removal and insertion without shutting down the server.

Existing systems implemented 64 bit PCI operations using a 32 bit Controller. The hot plug operation was implemented using a quick switch located on the PCI bus with the ability to disconnect a PCI slot from the PCI bus as directed by the PCI Controller typically with a bus enable signal. The control of the Req__64 line was implemented using discrete logic. In existing art, the hot plug power-up operation, known as connect-busfirst, proceeded with the Controller initiating the following events in the following sequence: power__enable, bus__enable, reset deassertion. In this sequence, a power__enable signal turns on the power of the PCI slot, the bus__enable signal closes the quick switch attaching the PCI slot to the PCI bus, and finally a reset signal is deasserted communicating to the PCI card located in the PCI slot to initiate operation.

Systems are being developed utilizing an actual 64 bit Controller which includes control of the Req__64 line. For 64 bit systems, the PCI card samples a control line called Req__64 a small delay time after receiving the reset signal. This line tells the card that it may operate in a 64 bit mode.

In implementing a server based on 66 megahertz PCI, the above procedure for powering up a PCI card are inadequate, although the procedure was sufficient for slower systems of the prior art. In implementing 66 megahertz PCI, there is a concern that future cards which plug into the PCI bus will need more time after the deassertion of reset to lock their internal phase lock loops, and possibly load the arrays for field programmable gate arrays. Thus, a future card operating on a 66 megahertz PCI may fail during the hot plug operation.

SUMMARY OF THE INVENTION

The present invention solves the above problem of preventing failure of hot plugability for a 66 Megahertz, 64 bit PCI bus. In order to solve this problem, the present invention initiates a connect__bus__last operation. The connect__bus__last operation proceeded with the Controller initiating the following events in sequence: power__enable, reset deassertion, bus__enable. In this sequence, the bus is connected last allowing the card time to get organized and configured after the reset deassertion before connecting the bus. The procedure of connecting the bus last creates a problem of its own in that although the card initiates sampling for the Req__64 signal after the reset, the card will not see this control signal due to the fact that the bus is still disconnected until the bus__enable signal is asserted. The present invention provides a simple solution to this problem by using a crossbar switch having one input tied to ground and the other tied to the Controller. The Req__64 signal bypasses the quick switch configuration and goes through the cross bar switch. The Req__64 signal is tied to ground during the time that the card samples for the 64 mode. Since the Req__64 signal is an active low signal, the card correctly identifies the system as 64 bit as indicated by the active low. Upon assertion of the bus__enable signal, the Req__64 control line is then attached to the expansion slot along with the other signal lines of the PCI bus.

In an embodiment of the present invention, an expansion slot containing a card has a plurality of contacts for receiving a plurality of signal lines from a bus, preferably a 64 bit, 66 Megahertz (MHz) PCI bus. The expansion slot also receives at one of the contacts a mode control line, preferably the Req__64 signal of a PCI bus. There are a plurality of switches corresponding to the plurality of signal lines, with one switch for each signal line. Each switch forms a switching action to either connect or disconnect a respective one of the plurality of signal lines of the bus from each of the respective contacts of the expansion slot. A bypass switch, connects (closed state) or disconnects (open state) the mode control line indicating one of a 32 bit bus mode and a 64 bit bus mode from one of the contacts of the expansion slot. The bypass switch in its open state is set to an active low wherein the 64 bus mode is thereby communicated to the card as an active low even when the signal lines of the bus are disconnected from the contacts of the expansion slot.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

Although a preferred embodiment of the present invention is illustrated in the accompanying Drawings and described in the forthcoming Detailed Description, it will be understood that the invention is not limited to the embodiment disclosed, but is capable of numerous rearrangements, modifications and substitutions without departing from the spirit of the invention as set forth herein.

Figure 1:
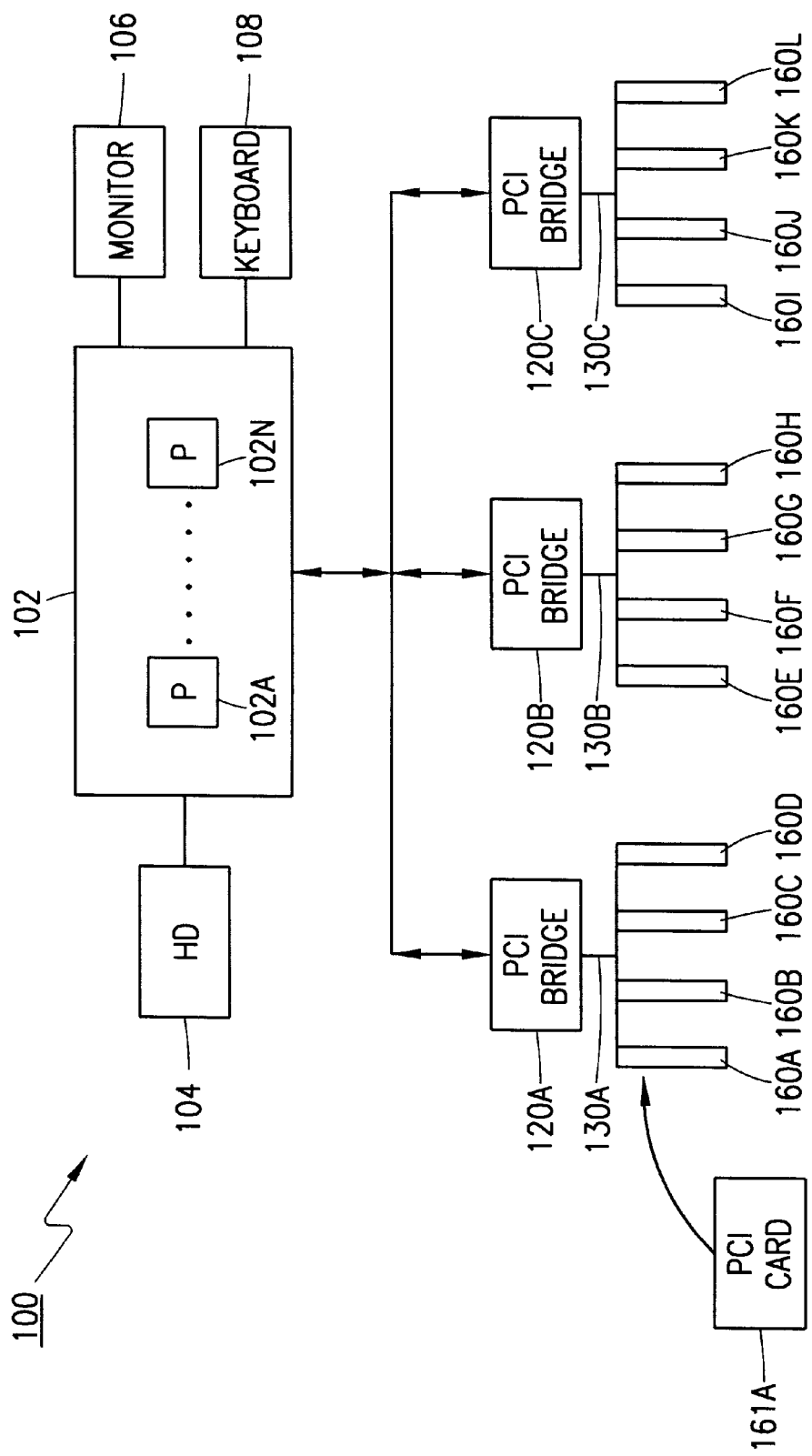
FIG. 1 illustrates a block diagram of a presently preferred exemplary embodiment of a computer system in which the teachings of the present invention may be utilized.

FIG. 1 illustrates a typical computer system 100 according to the present invention. While this system is illustrative of one embodiment, the techniques according to the invention can be implemented in a wide variety of systems. Preferably, computer system 100 is organized as a "zero downtime," highly available, high-end server system, but the present invention may be practiced in virtually all types of computers.

The computer system 100 has a computer module 102 comprising one or more processors 102A . . . 102N coupled via a host bus 110. Thus, for example, the one or more processors 102 could be a tightly coupled system of Intel Pentium Pro™ processors. The one or more processors 102A . . . 102N are coupled to input and output devices, for example, at a minimum, there is a keyboard 108, a monitor 106, and a hard disk drive 104. In the exemplary computer system 100, the preferred host bus is compatible with the Gunning Transistor Logic (GTL) bus protocol. The exemplary input/output system for computer system 100 comprises a plurality of expansion slots 160A–160L suitable for a PCI bus type. Typically, in a computer system, there may be several PCI Controllers, with one PCI Controller for one or more PCI slots. For example, in FIG. 1, PCI Controller 120A controls information transfer to and from PCI slots 160A–160D via PCI bus 130A. Similarly, PCI Controller 120B controls information flow over PCI bus 130B to PCI slots 160E–160H and PCI Controller 120C controls information flow over PCI bus 130C to PCI slots 160I–160L. Each of the PCI slots is capable of receiving a PCI card (not shown in picture). For example, a PCI card 161A plugs into slot 160A. A PCI card installed into a system adds additional functionality to the system. The PCI bus typically couples a variety of devices, for example a hard disk drive, that generally take advantage of a high speed data path. For each device, a corresponding PCI card for that device would be plugged into one of the PCI expansion slots.

Figure 2:
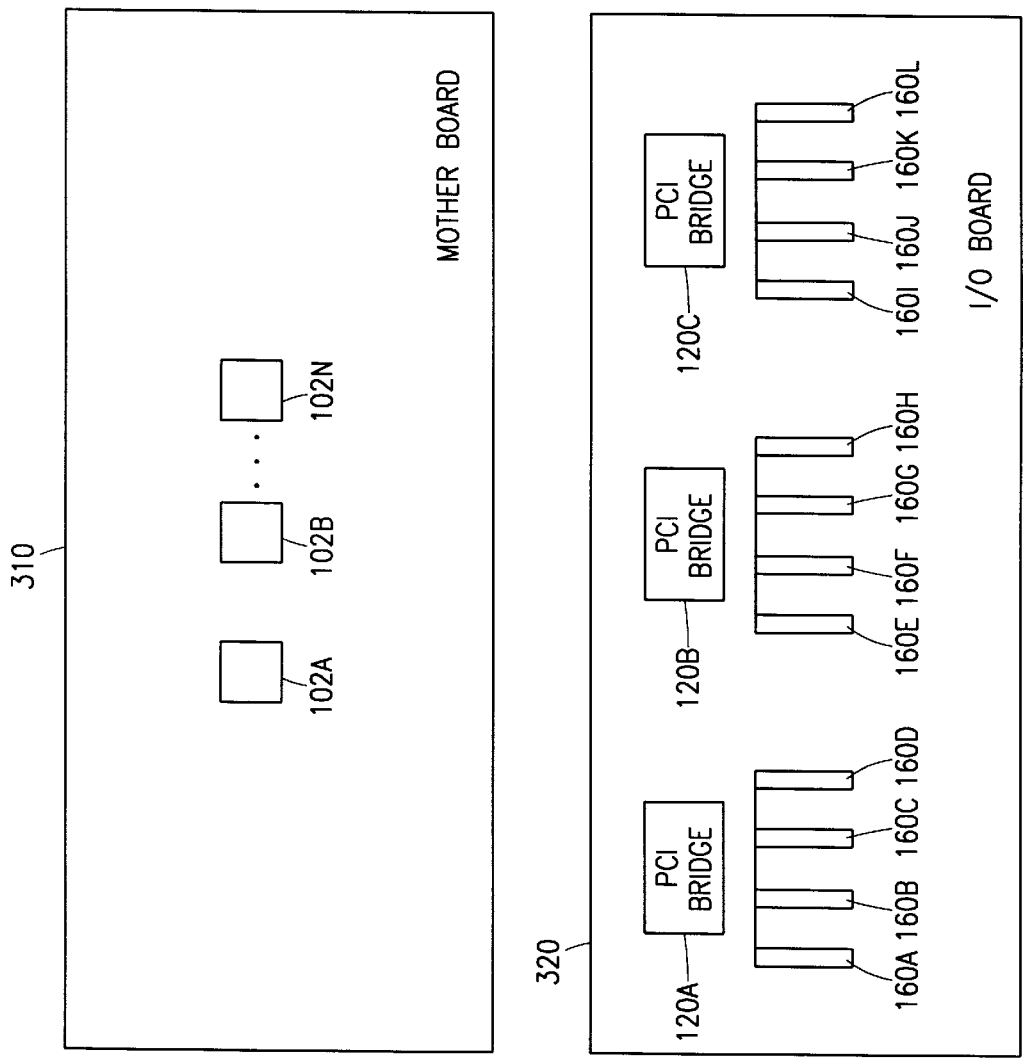
FIG. 2 illustrates a board-level block diagram of a presently preferred exemplary embodiment of a computer system in which the teachings of the present invention may be utilized.

In FIG. 2, there is illustrated a board level diagram of the present invention of FIG. 1. In this configuration, the processors 102A–102N are located on a host board 310 and the PCI Controllers 120A–120C and the PCI slots 160A–160L are located on an I/O board 320. Other configurations are possible, including having multiple processor boards, multiple I/O boards, or also possibly having one or more PCI Controllers located on a host board.

Figure 3:
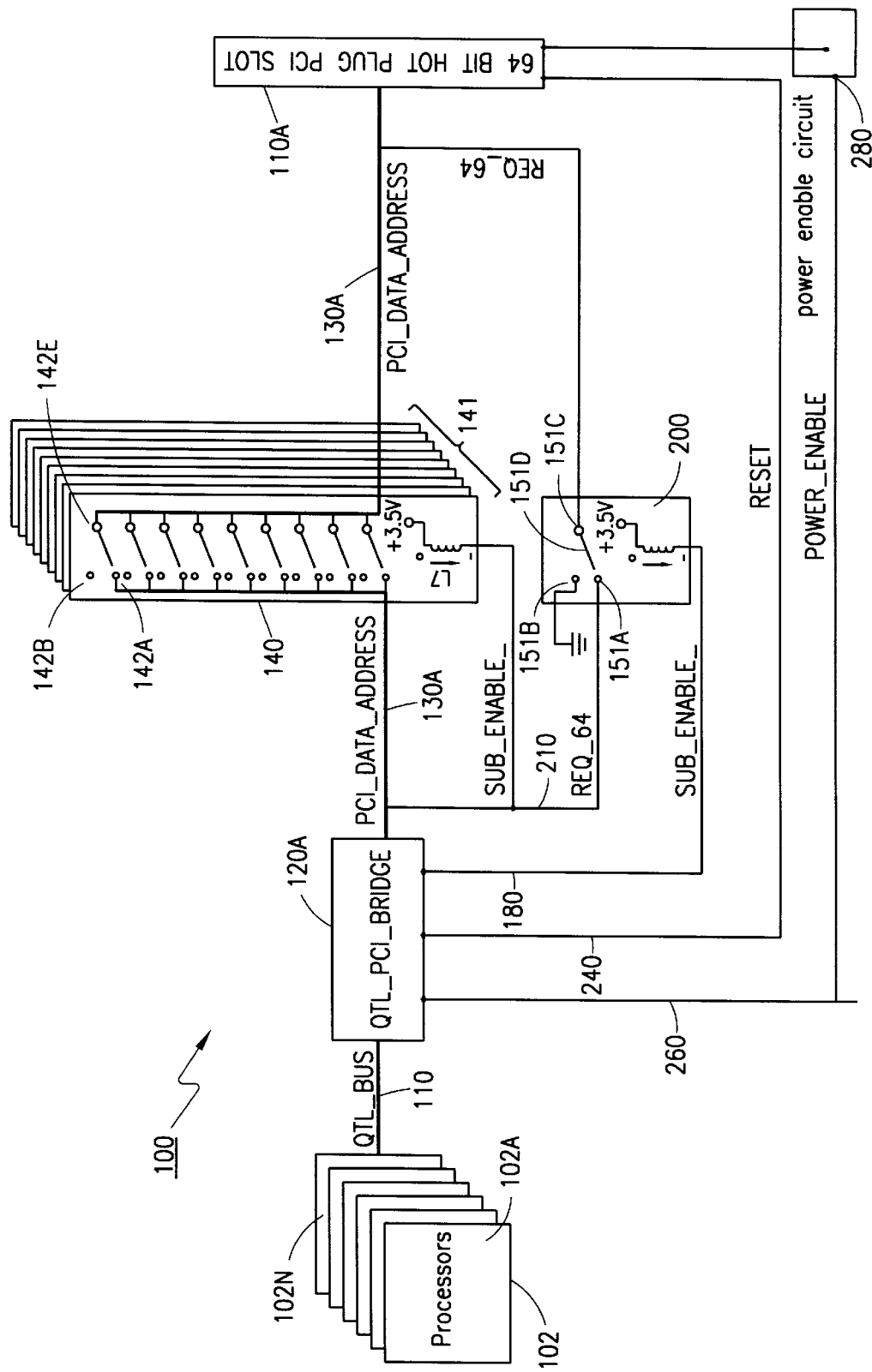
FIG. 3 depicts a device-level block diagram of an exemplary embodiment of a switching mechanism, including quick switch modules and crossbar switch, according to the present invention.

In FIG. 3, illustrating a preferred embodiment of the present invention, there is shown one or more processors 102A–102N connected to each other via host bus 110. Also illustrated is a single PCI slot 160A coupled to PCI (peripheral component interconnect) Controller 120A (the "host bridge"). The other PCI slots which may be attached to PCI Controller 120A (not shown) would be similarly connected. Controller 120A couples the PCI bus 130A to one or more 64 bit hot plug PCI slots 160 (although one slot 160A is illustrated in the diagram). PCI bus 130A comprises a plurality of signal lines, including control lines, address lines, and data lines. The PCI bus has a double-width version (64 bits vs. 32 bits) and a fast version (66 MHZ vs. 33 MHZ). Preferably, the present invention provides hot plug capability for a 66 MHZ, 64 bit PCI bus.

FIG. 3 shows a stack 141 of nine quick switch modules where each quick switch module 140 has ten individual quick switches, one individual quick switch per signal line. Nine quick switch modules and a crossbar switch are able to provide sufficient switches for each of the signal lines of a 64 bit hot plug slot (including the data lines, address lines, and control lines).

The quick switch modules 141 provides the capability to electrically isolate 64 bit PCI slot 160a from the computer system. Generally, the signal lines may be address lines, data lines, or control lines making up the bus. A quick switch module 140 does not have to contain exactly 10 switches and in an alternate embodiment there could be a general number of individual quick switches to accommodate the signal lines. The quick switch is controlled by PCI Controller 120a by asserting and diasserting bus_enable signal 180. When bus-enable signal 180 is deasserted, input 142C is connected to a very light (~10K ohm) pull up resistor. When bus enable signal 180 is asserted input 142C is connected to 142A.

Figure 4:
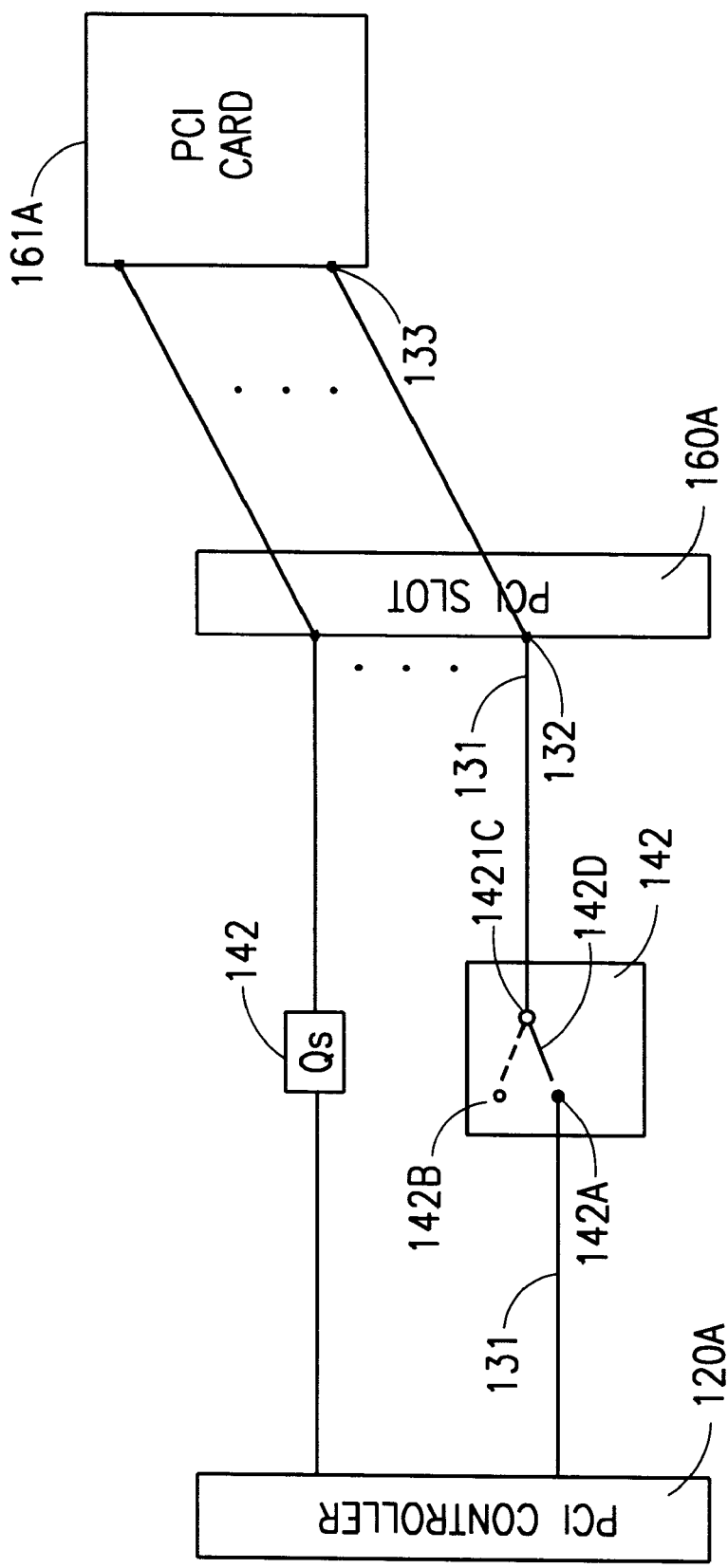
FIG. 4 illustrates the action of an individual quick switch according to the present invention.

Referring to FIG. 3 and FIG. 4, the operation of an individual quick switch 142 is illustrated as inputs 142A–142C. In FIGS. 3 and 4, quick switch 142 and crossbar switch are analog switches graphically represented as mechanical relays. The single quick switch 142 closes and opens the signal line 131. PCI bus 130A comprises a plurality of signal lines, a typical signal line 131 being illustrated in FIG. 4. An open state is signified by lead 142D forming a contact with point 142B. The quick switch open state is made high with a light internal pull up resistance as is well known in the electrical art. The closed state is signified by a closed contact between points 142C and 142A. Referring to FIG. 4, a closed circuit is formed in the closed state of switch 142 so that information flows along signal line 131 from PCI Controller 120A to an electrical contact 132 located on PCI slot 160 which electrically contacts with contact 133 of PCI card 161A when PCI card 161A is seated in slot 160A.

Turning again to FIG. 3, the operation of crossbar switch 200 is illustrated. The crossbar switch is implemented with a hard pull down applied to the alternate input, a particular switch arrangement which is well known in the electrical art. Thus, when bus-enable signal 180 is asserted, input 142C connects to input 142A creating a closed circuit. In the bus_disabled state, input 142C is connected to input 142B which is tied to a pull down resistor which grounds the Req_64 signal illustrated by lead 151D flipping so that point 151B connects to 151C.

Figure 5:
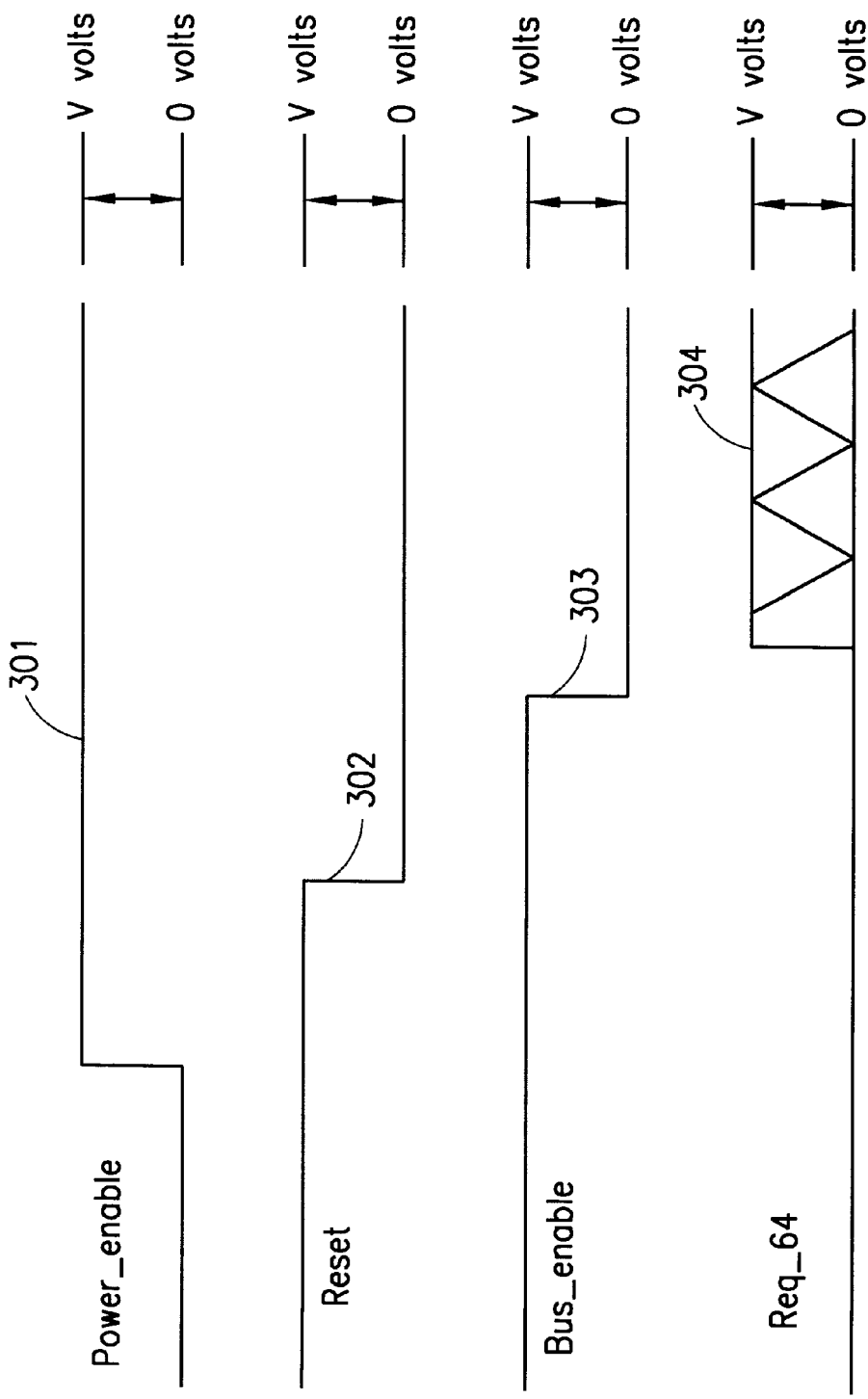
FIG. 5 depicts a timing diagram illustrating the timing of the control signals according to the present invention.

The operation of connecting the hot plug expansion slot 160A to the computer system (to Controller 120A) according to the present invention is now described referring to the circuitry in FIG. 3. and the timing diagram of FIG. 5.

PCI Controller 120A controls the power supplied to PCI slot 160A via the power_enable line 260. To begin the power up sequence, PCI Controller 120A asserts power_enable line 260 by raising the line to a positive voltage according to the timing diagram 301 which signals power enable circuit 280 to power up PCI slot 160A.

In the next event of the sequence, PCI Controller 120A takes the PCI card (not shown) attached to PCI slot out of reset 160A by deasserting the reset signal line 240 according to the timing diagram 302. As shown in FIG. 5, the reset is an active low signal.

A brief time delay after the assertion of the reset signal, the circuitry of card 161A located in slot 160A begins looking for the Req_64 signal in order to determine whether the system mode is 64 bit or 32 bit. During this period, the crossbar switch connects the PCI card side of Req_64 to ground. This is illustrated as lead 151D connecting points 151B and 151C. Preferably, this switch is implemented with a hard pull down resistance as is well known in the electronic arts. Thus, as indicated in timing diagram 304, the card sampling Req_64 will see a signal indicating 64 bit mode because this signal is asserted as an active low.

Finally, in the power up sequence, the bus_enable signal assert according to timing diagram 303 which simultaneously closes the quick switches of quick switch modules 141 and connects the crossbar switch 200. The same bus_enable signal is switching each of the quick switches from a light internal pull up to a connected bus and switches the crossbar switch from a hard pull down to a connected bus. Since the crossbar switch is closed, the voltage of the Req_64 line will be the voltage of the Req_64 line connected to the controller. This is indicated in timing diagram 304 as a crosshatched area.

Therefore, with the above described invention, a 66 Mhz, 64 bit PCI card may be safely hot plugged because the devices on the PCI card are given ample time to respond to a reset deassertion before the bus is connected.

What is claimed is:

1. An apparatus for hot plugging an expansion slot containing a card, the expansion slot having a plurality of contacts for receiving a plurality of signal lines from a bus, the expansion slot receiving at one of the contacts a mode control line, comprising:
   a plurality of switches corresponding to the plurality of signal lines, each switch forming a switching action to perform one of connecting and disconnecting a respective one of the plurality of signal lines of the bus from each of the respective contacts of the expansion slot; and
   a bypass switch for one of connecting and disconnecting a mode control line indicating one of a 32 bit bus mode and a 64 bit bus mode from a mode controller to a contact of the expansion slot, wherein the bypass switch is configured to directly couple the contact to an active low voltage wherein the 64 bit bus mode is thereby communicated to the card when the signal lines of the bus are disconnected from the contacts of the expansion slot.

2. The apparatus of claim 1, wherein the bus is a 64 bit PCI bus.

3. The apparatus of claim 1, wherein the bus operates at 66 megahertz.

4. The apparatus of claim 1, wherein each switch of the plurality of switches has a disconnected state implemented as a weak pull up producing a voltage high.

5. The apparatus of claim 1, wherein the analog bypass switch implements a disconnected state with an input pulled down to ground.

6. The apparatus of claim 1, further comprising:
   a bus_enable signal connected to each of the plurality of switches and further connected to the analog bypass switch, wherein asserting the bus_enable signal closes the plurality of switches and further closes the bypass switch.

7. A bypass circuit for switching a mode control line between a first state and a second state, the switch disposed between a first section of the mode control line and a second section of the mode control line, the first section being connected to a controller and a second section of the mode control line being connected to an expansion card, comprising:
   means for communicating in the first state an active low signal to the expansion card when a plurality of switches controlling signal lines to the expansion card are open, the active low signal being interpreted by the expansion card as a 64 bit mode;
   means for placing the switch to the second state connecting the controller to the expansion card.

8. A computer system, comprising:
   an interface board;
   a PCI bus disposed on the interface board, the PCI bus providing a conductive transmission path among a plurality of expansion slots disposed on the interface board, each expansion slot receiving and securing an expansion card when the card is presented thereto;
   a PCI controller disposed on the interface board for controlling the PCI bus;
   a plurality of switches disposed on the interface board corresponding to a plurality of signal lines of the PCI bus, each switch forming a switching action to perform one of connecting and disconnecting a respective one of the plurality of signal lines of the PCI bus from a respective each of a plurality of contacts of a first expansion slot of the plurality of expansion slots; and
   a bypass switch disposed on the interface board for directly connecting and disconnecting a mode control line indicating one of a 32 bit bus mode and a 64 bit bus mode from the PCI controller to a first contact of the first expansion slot, the bypass switch in an open state directly coupling the first contact to a low voltage wherein the 64 bus mode is thereby communicated to the card as an active low during the period when the signal lines of the bus are disconnected from the contacts of the first expansion slot.

9. The computer system of claim 8, further comprising:
   a motherboard comprising a plurality of processors;
   a host bus located on the motherboard, the plurality of processors coupled via the host bus;
   wherein
   the host bus communicates data through the host bus to the PCI controller.

10. The computer system of claim 8, wherein the PCI bus is a 64 bit PCI bus.

11. The computer system of claim 8, wherein the bus is a PCI bus operating at 66 Megahertz.

12. A computer system, comprising:
    one or more processors coupled by a host bus;
    a keyboard for inputting first data to the one or more processors,
    a monitor for viewing second data output from the one or more processors,
    a hard drive for storing third data from the one or more processors;
    a plurality of expansion slots for holding a plurality of expansion cards;
    one or more controllers for transmitting information from the one or more processors to the plurality of expansion cards, wherein at least a first controller of the one or more controllers communicates to a first slot of the plurality of expansion slots over a bus holding a first card of the plurality of expansion cards;

a plurality of switches corresponding to the plurality of signal lines of the bus, each switch forming a switching action to perform one of connecting and disconnecting a respective one of the plurality of signal lines of the bus from each of respective contacts of the first slot; and a bypass switch operating in cooperation with the plurality of switches for one of connecting and disconnecting a mode control line indicating one of a first bus mode and a second bus mode from a contact of the first slot, the bypass switch having contacts to couple the first contact directly to an active low voltage wherein the second bus mode is thereby communicated to the first card as an active low when the signal lines of the bus are disconnected from the contacts of the first slot by the plurality of switches.

13. The computer system of claim 12, wherein the bus is a 64 PCI bus.

14. The computer system of claim 12, wherein the bus is a PCI bus operating at 66 Megahertz.

15. The computer system of claim 12, wherein the plurality of expansion cards are PCI cards.

16. A method for activating a hot plug expansion slot for receiving and securing an expansion card, the expansion slot being coupled to a plurality of signal lines of a bus by a plurality of switches, the method following the following sequence, comprising the steps of:

enabling power to the expansion slot and the corresponding expansion card;

resetting the expansion card;

sampling a mode control line, the mode control line being directly coupled by a bypass switch to an active low voltage during a time period after reset but before enabling the bus, the active low voltage communicating to the expansion card during said time period that the mode of the system is 64-bit mode; and connecting the plurality of signal lines to the bus by closing the plurality of switches to the expansion card and simultaneously connecting the mode control line to a mode controller by operating the bypass switch.

17. The method of claim 16, wherein the bus is a 64 PCI bus.

18. The method of claim 16, wherein the bus is a PCI bus operating at 66 Megahertz.

* * * * *